US008202653B2

(12) United States Patent
Buiel et al.

(10) Patent No.: US 8,202,653 B2
(45) Date of Patent: Jun. 19, 2012

(54) ELECTRODE WITH REDUCED RESISTANCE GRID AND HYBRID ENERGY STORAGE DEVICE HAVING SAME

(75) Inventors: Edward R. Buiel, New Castle, PA (US); Joseph E. Cole, New Castle, PA (US)

(73) Assignee: Axion Power International, Inc., New Castle, PA (US)

( * ) Notice: Subject to any disclaimer, the term of this patent is extended or adjusted under 35 U.S.C. 154(b) by 1278 days.

(21) Appl. No.: 11/875,119

(22) Filed: Oct. 19, 2007

(65) Prior Publication Data

US 2008/0131763 A1 Jun. 5, 2008

Related U.S. Application Data

(60) Provisional application No. 60/891,151, filed on Feb. 22, 2007, provisional application No. 60/853,438, filed on Oct. 23, 2006.

(51) Int. Cl.
*H01M 4/72* (2006.01)
*H01M 4/74* (2006.01)

(52) U.S. Cl. ......... 429/243; 429/239; 429/236; 429/245

(58) Field of Classification Search ............... 429/233, 429/236, 239, 241, 243–245
See application file for complete search history.

(56) References Cited

U.S. PATENT DOCUMENTS

| | | |
|---|---|---|
| 397,796 A | 2/1889 | Gibson |
| 704,739 A | 7/1902 | Entz |
| 1,594,810 A | 8/1926 | Benner et al. |
| 3,275,473 A | 9/1966 | Barnett et al. |
| 3,306,779 A | 2/1967 | Flannery et al. |
| 3,352,718 A | 11/1967 | Carson, Jr. et al. |
| 3,404,061 A | 10/1968 | Bochman et al. |
| 3,434,883 A | 3/1969 | Cretella et al. |
| 3,457,112 A | 7/1969 | Reber |
| 3,692,587 A | 9/1972 | Faust et al. |
| 3,856,574 A | 12/1974 | Amagi et al. |
| 3,859,134 A | 1/1975 | Shirodker |
| 3,926,764 A | 12/1975 | Ruzicka et al. |
| 4,014,730 A | 3/1977 | Selover, Jr. et al. |
| 4,265,952 A | 5/1981 | Caines |
| 4,438,481 A | 3/1984 | Phillips et al. |
| 4,725,927 A | 2/1988 | Morimoto et al. |
| 4,862,328 A | 8/1989 | Morimoto et al. |
| 5,006,426 A | 4/1991 | Suzuki et al. |
| 5,162,172 A | 11/1992 | Kaun |
| D332,082 S | 12/1992 | Cordes et al. |

(Continued)

FOREIGN PATENT DOCUMENTS

JP 06342660 A 12/1994

(Continued)

OTHER PUBLICATIONS

Machine translation of JP 2003051306.

(Continued)

*Primary Examiner* — Tracy Dove
(74) *Attorney, Agent, or Firm* — Cahn & Samuels, LLP

(57) ABSTRACT

An electrode includes a current collector comprising a grid, said grid comprising a plurality of planar, parallel rows disposed between interleaved rows having raised and lowered segments, and a tab portion extending from a side of the current collector. Raised and lowered segments are disposed horizontally relative to the tab portion, thereby providing substantially uninterrupted conductive ribbons extending from the bottom of the current collector to the tab portion.

15 Claims, 9 Drawing Sheets

U.S. PATENT DOCUMENTS

| | | | |
|---|---|---|---|
| 5,264,306 | A | 11/1993 | Walker, Jr. et al. |
| 5,476,734 | A | 12/1995 | Pulley et al. |
| 5,494,763 | A | 2/1996 | Behl et al. |
| 5,581,438 | A | 12/1996 | Halliop |
| 5,711,988 | A | 1/1998 | Tsai et al. |
| 5,744,258 | A | 4/1998 | Bai et al. |
| 5,989,749 | A | 11/1999 | Kao et al. |
| 6,021,039 | A | 2/2000 | Inagawa et al. |
| 6,195,252 | B1 | 2/2001 | Belyakov et al. |
| 6,222,723 | B1 | 4/2001 | Razoumov et al. |
| 6,316,148 | B1 | 11/2001 | Timmons et al. |
| 6,335,858 | B1 | 1/2002 | Vasechkin et al. |
| 6,426,862 | B1 | 7/2002 | Vasechkin et al. |
| 6,466,429 | B1 | 10/2002 | Volfkovich |
| 6,531,240 | B1 | 3/2003 | Brown |
| 6,628,504 | B2 | 9/2003 | Volfkovich et al. |
| 6,643,119 | B2 | 11/2003 | Nanjundiah et al. |
| 6,706,079 | B1 | 3/2004 | Shmatko et al. |
| 6,833,218 | B2 | 12/2004 | Mann |
| 6,946,007 | B2 | 9/2005 | Bendale et al. |
| 7,006,346 | B2 | 2/2006 | Volfkovich et al. |
| 7,060,391 | B2 | 6/2006 | Gyenge et al. |
| 7,110,242 | B2 | 9/2006 | Adrianov et al. |
| 7,119,047 | B1 | 10/2006 | Adrianov et al. |
| 7,312,976 | B2 | 12/2007 | Kazaryan et al. |
| 7,443,650 | B2 | 10/2008 | Nedoshivin et al. |
| 2001/0003024 | A1 | 6/2001 | Nemoto |
| 2002/0028389 | A1 | 3/2002 | Sonoda et al. |
| 2002/0080553 | A1 | 6/2002 | Pekala |
| 2003/0086238 | A1 | 5/2003 | Bendale |
| 2003/0110607 | A1 | 6/2003 | Bendale et al. |
| 2004/0005502 | A1 | 1/2004 | Schlag |
| 2005/0002150 | A1 | 1/2005 | Volfkovich et al. |
| 2006/0073345 | A1 | 4/2006 | Naruse |
| 2006/0291140 | A1 | 12/2006 | Kazaryan et al. |
| 2006/0292384 | A1 | 12/2006 | Kazaryan et al. |
| 2007/0003833 | A1 | 1/2007 | Li et al. |
| 2007/0128472 | A1 | 6/2007 | Tierney et al. |
| 2008/0100990 | A1 | 5/2008 | Buiel et al. |
| 2008/0113268 | A1 | 5/2008 | Buiel et al. |
| 2008/0131763 | A1 | 6/2008 | Buiel et al. |
| 2009/0035657 | A1 | 2/2009 | Buiel et al. |
| 2009/0103242 | A1 | 4/2009 | Buiel et al. |
| 2010/0040950 | A1 | 2/2010 | Buiel et al. |

FOREIGN PATENT DOCUMENTS

| | | |
|---|---|---|
| JP | 07235454 A | 9/1995 |
| JP | 11329420 A | 11/1999 |
| JP | 2003051306 A | 2/2003 |
| JP | 2003126863 A | 5/2003 |
| JP | 2004335823 A | 12/2004 |
| KR | 1020060042860 A | 5/2006 |
| WO | WO 2005027255 A1 | 3/2005 |

OTHER PUBLICATIONS

English Abstract of JP 2003126863, May 7, 2003.
International Search Report and Written Opinion for PCT/US2008/079901 dated Mar. 24, 2009.
English Abstract of JP 2004335823, Dec. 16, 2004.
English Abstract of JP 07235454, Sep. 5, 1995.
Abstract of JP 11329420, Nov. 30, 1999.
Abstract of JP 06342660, Dec. 13, 1994.
Abstract of KR1020060042860, May 15, 2006.

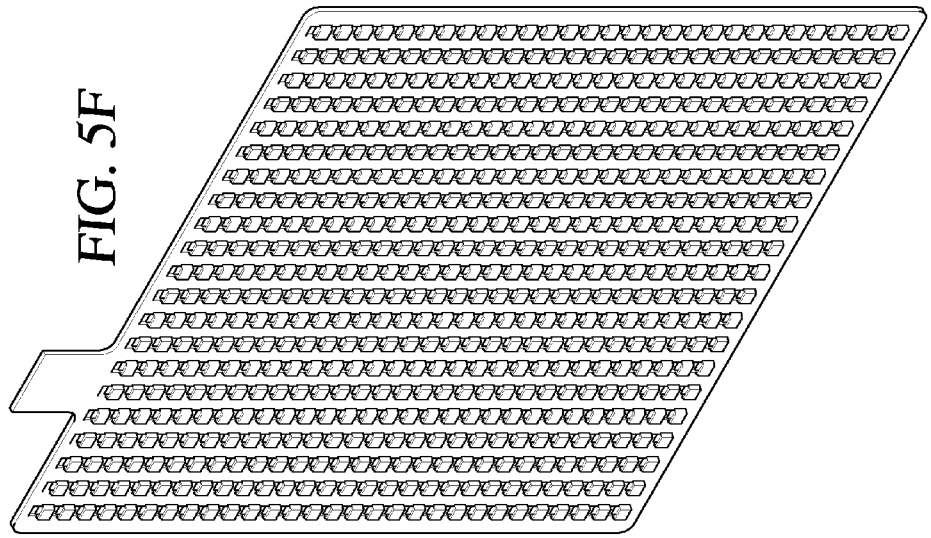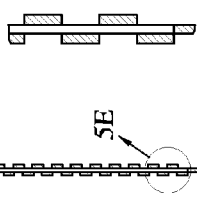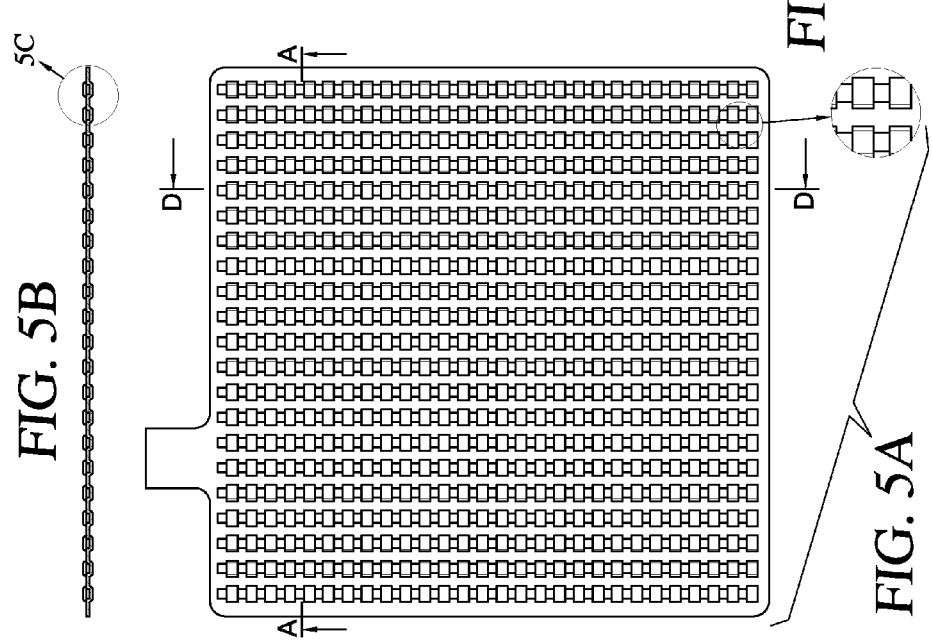

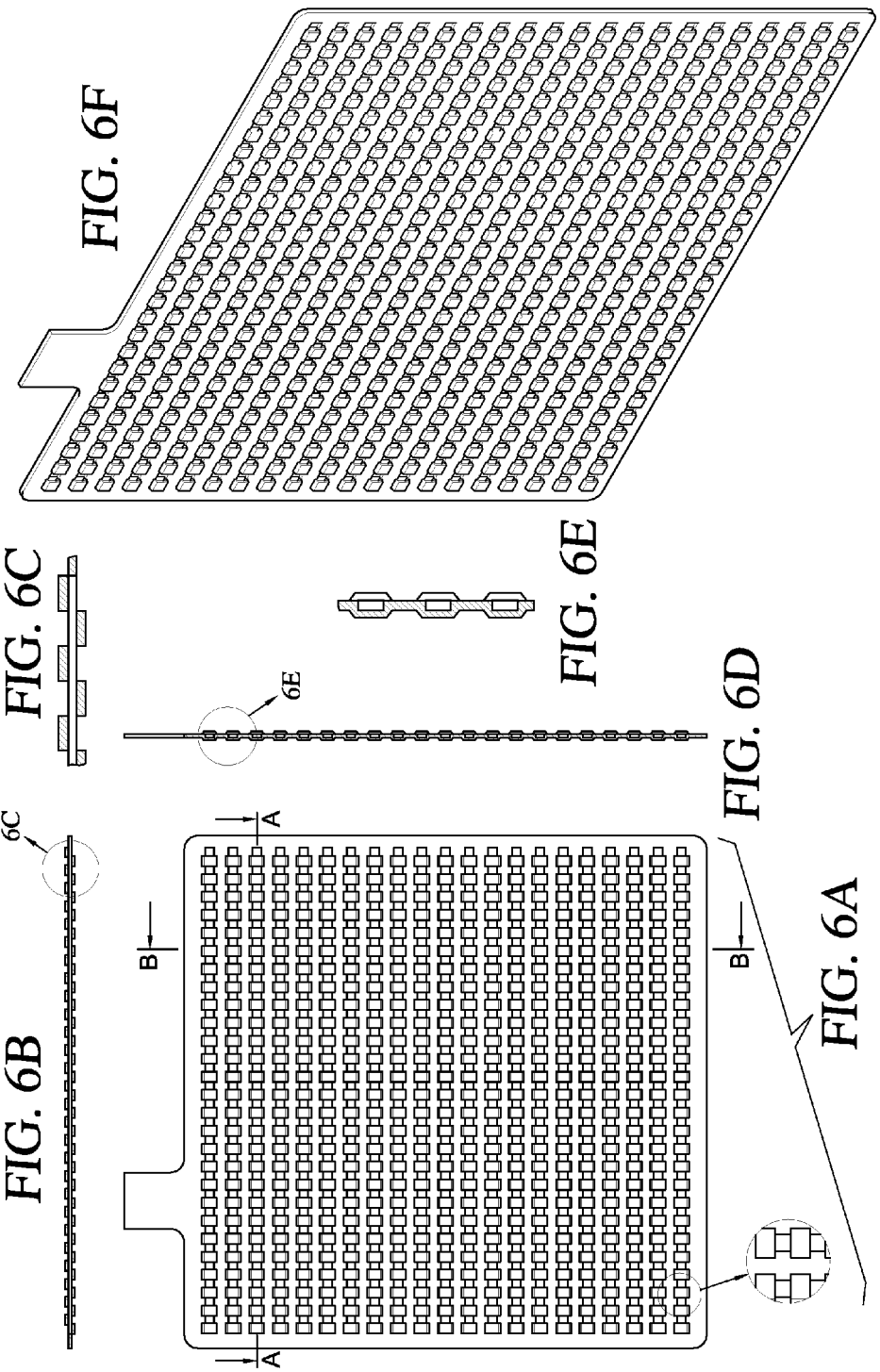

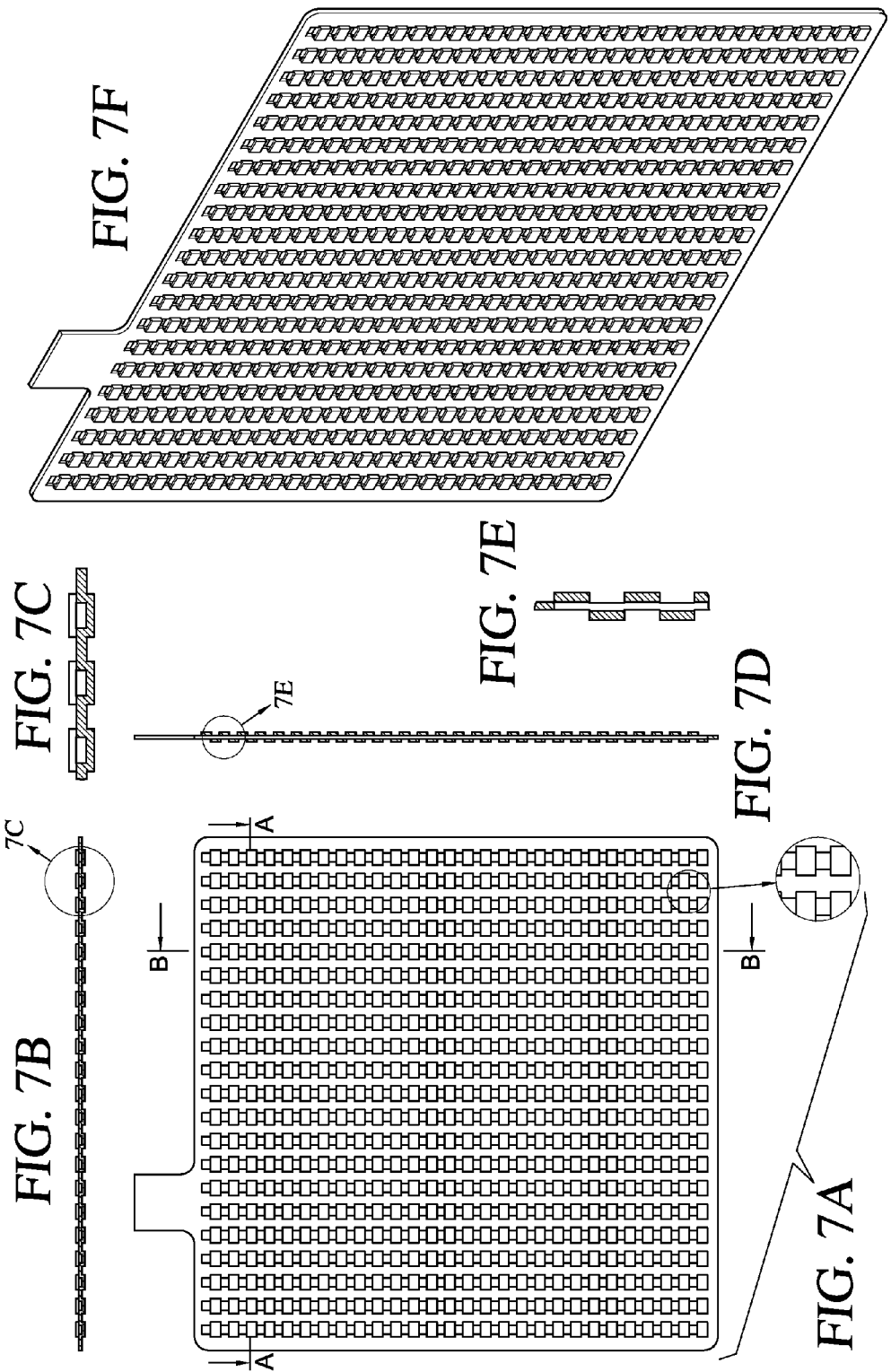

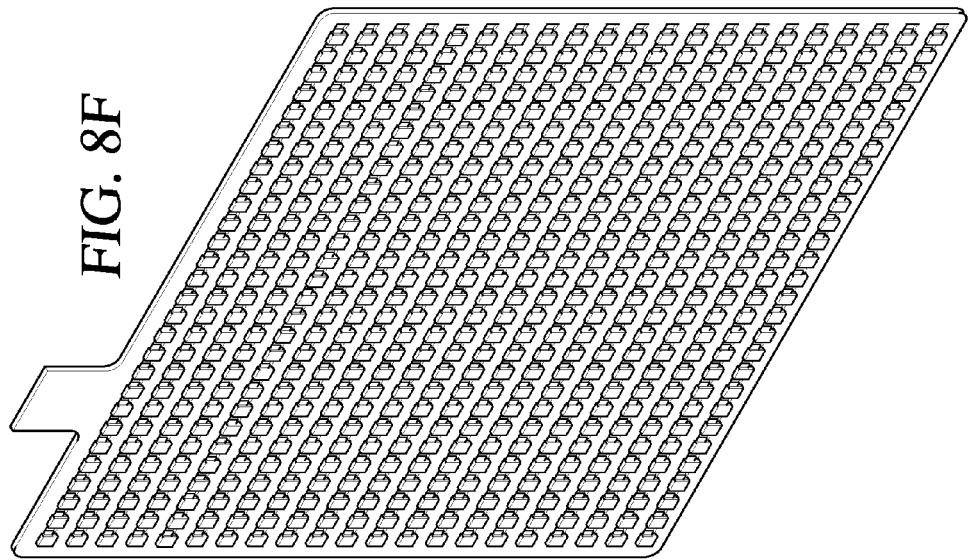
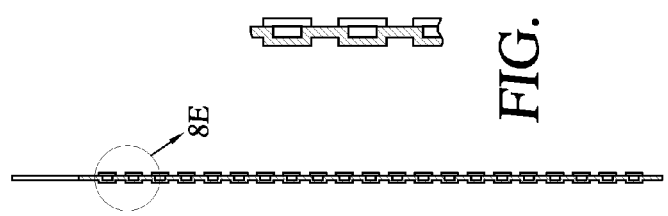
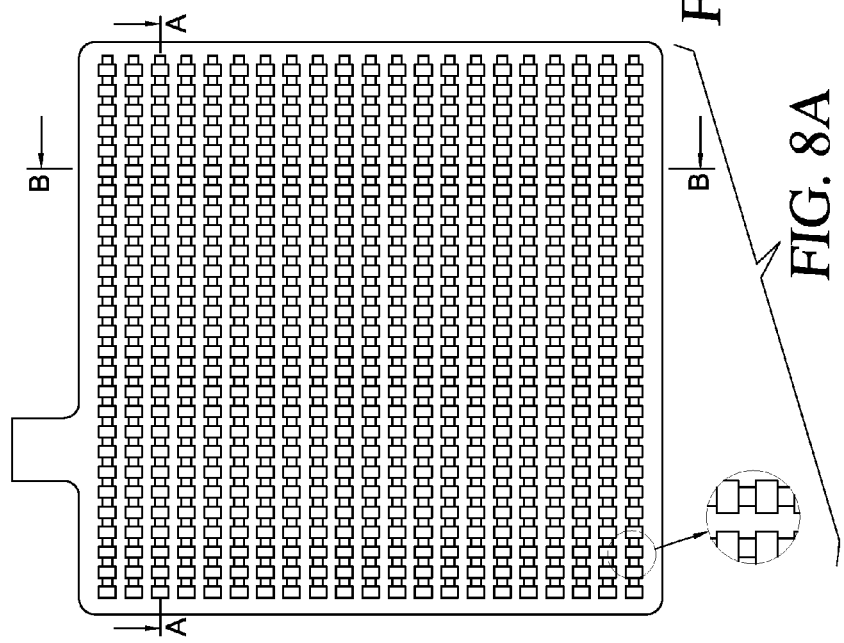

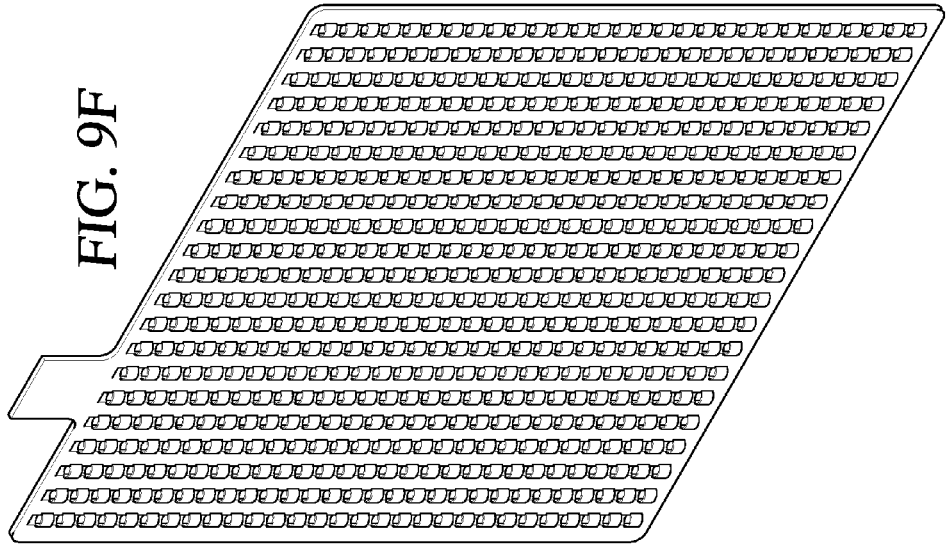
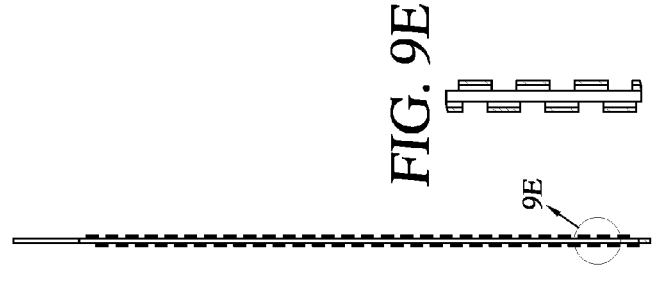
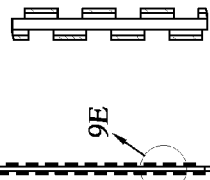
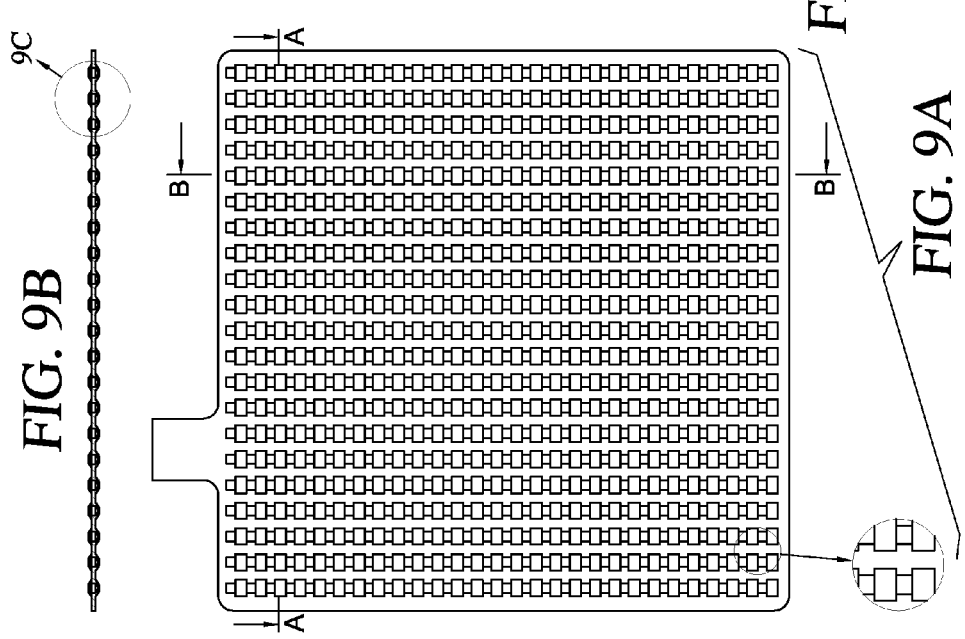

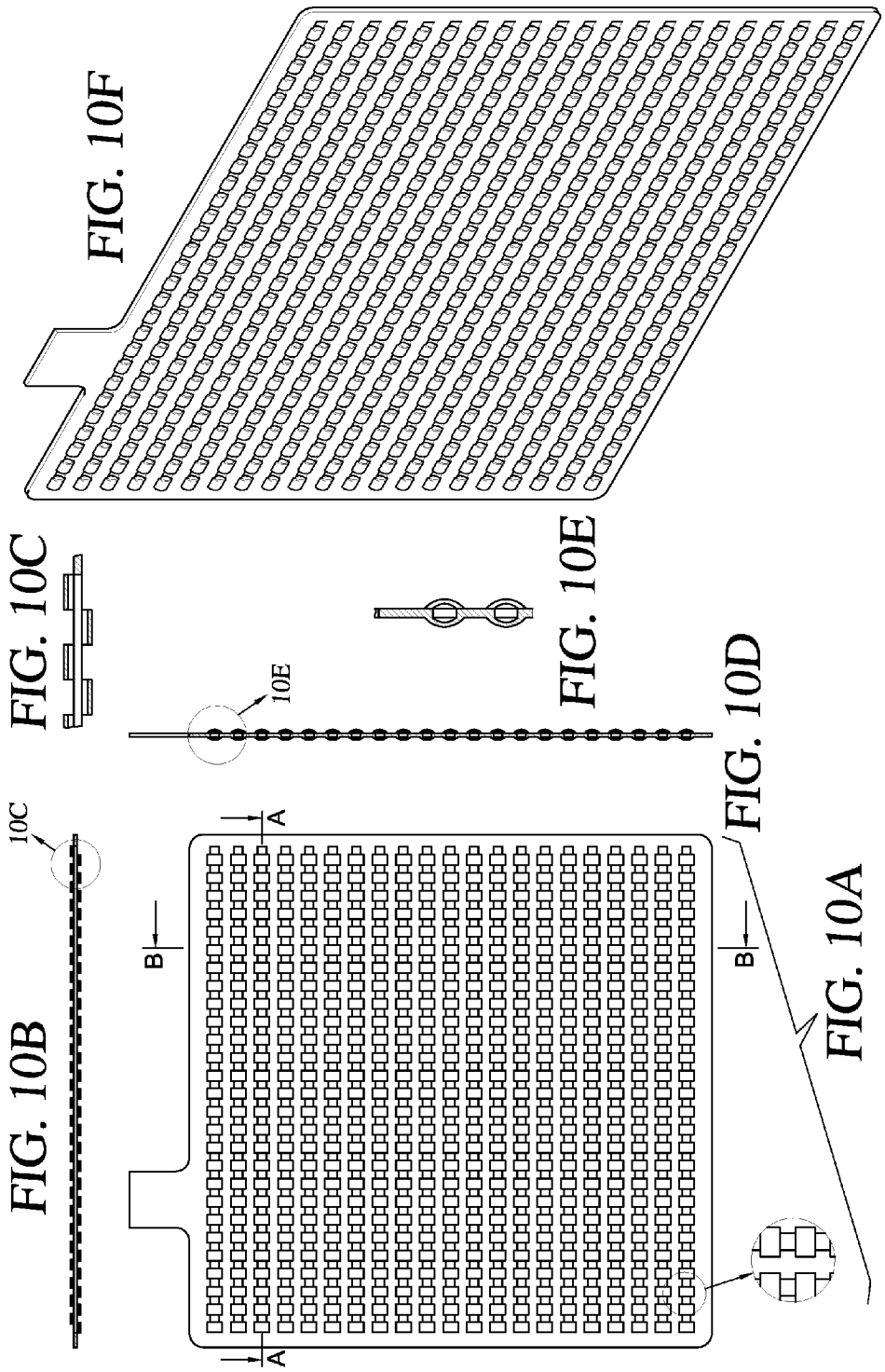

ELECTRODE WITH REDUCED RESISTANCE GRID AND HYBRID ENERGY STORAGE DEVICE HAVING SAME

I. RELATED APPLICATIONS

This application claims priority of U.S. Ser. No. 60/853,438 filed on Oct. 23, 2006, the entirety of which is incorporated by reference herein.

This application claims priority of U.S. Ser. No. 60/891,151 filed on Feb. 22, 2007, the entirety of which is incorporated by reference herein.

II. FIELD OF THE INVENTION

This invention relates to an electrode having a reduced resistance grid and to a hybrid energy storage device comprising at least one such electrode.

III. BACKGROUND OF THE INVENTION

Hybrid energy storage devices, also known as asymmetric supercapacitors or hybrid battery/supercapacitors, combine battery electrodes and supercapacitor electrodes to produce devices having a unique set of characteristics including cycle life, power density, energy capacity, fast recharge capability, and a wide range of temperature operability. Hybrid lead-carbon energy storage devices employ lead-acid battery positive electrodes and supercapacitor negative electrodes. See, for example, U.S. Pat. Nos. 6,466,429; 6,628,504; 6,706,079; 7,006,346; and 7,110,242.

The positive electrode of a hybrid energy storage device effectively defines the active life of the device. Just as with lead-acid batteries, the lead-based positive electrode typically fails before the negative electrode. Such failures are generally the result of the loss of active lead dioxide paste shedding from the current collector grid as a consequence of spalling and dimensional change deterioration that the active material undergoes during charging and discharging cycles.

U.S. Pat. No. 5,264,306 describes a lead acid battery system having a plurality of positive grids and a plurality of negative grids with respect of chemical pastes placed therein, where each of the grids has a mean plane and a matrix of raised and lowered portions formed in vertically oriented rows which alternate with undisturbed portions that provide unobstructed current channels extending from the lower areas of the grid plate to the upper areas of the grid plate with a conductive tab affixed thereto. However, the raised and lowered portions are oriented in the vertical direction as established by horizontally disposed slots. Further, the teachings of the grid specifically relate to lead-acid batteries. The teachings fail to consider the adverse impact of evolving boundary conditions resulting from the horizontally directed interruptions in the plate.

U.S. Design Pat. Des. 332,082 shows a battery plate grid of the sort which is described and used in lead-acid batteries as taught in U.S. Pat. No. 5,264,306. Both U.S. Pat. No. 5,264,306 and U.S. Design Pat. Des. 332,082 are incorporated herein by reference in their entireties.

The inventors have discovered that reorientation of raised and lowered portions of a current collector grid to a horizontal configuration (and correspondingly reorienting the grid channels) reduces or minimizes boundary conditions in the direction of current flow from lower portions to upper portions of the grid plate and to an associated collector tab structure for at least one of a positive electrode or a negative electrode.

IV. SUMMARY OF THE INVENTION

It is an object of the present invention to provide an electrode that minimizes spalling or flaking of the active material during charge and discharge cycles.

It is yet another object of the present invention to reduce or minimize boundary conditions in the direction of current flow from lower portions to upper portions of the grid plate and to the associated collector tab structure of an electrode.

It is an object of the present invention to provide a hybrid energy storage device having improved cycle life.

It is an advantage of the present invention that there is reduced likelihood of failure of a positive electrode and a hybrid energy storage device containing such a positive electrode.

In accordance with one aspect of the present invention, an electrode is provided comprising a current collector comprising a grid, the grid comprising a plurality of planar, parallel rows disposed between interleaved rows having raised and lowered segments, and a tab portion extending from a side of the current collector. The rows of raised and lowered segments extend in a horizontal configuration relative to the tab portion, thereby providing substantially uninterrupted conductive ribbons extending from the bottom of the current collector to the tab portion.

As used herein "substantially", "generally", "relatively", "approximately", and "about" are relative modifiers intended to indicate permissible variation from the characteristic so modified. It is not intended to be limited to the absolute value or characteristic which it modifies but rather approaching or approximating such a physical or functional characteristic.

References to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

In the following description, reference is made to the accompanying drawings, which are shown by way of illustration to specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

V. BRIEF DESCRIPTION OF THE DRAWINGS

FIG. 5A illustrates a grid plate having vertical angled slots.

FIG. 5B is a cross sectional view of the grid plate of FIG. 5A along an A-A axis.

FIG. 5C is a magnified view of detail B of FIG. 5B.

FIG. 5D is a cross sectional view of the grid plate of FIG. 5A along a D-D axis.

FIG. 5E is a magnified view of detail D of FIG. 5D.

FIG. 5F is a perspective view of the grid plate of FIG. 5A.

FIG. 6A illustrates a grid plate according to the present invention having horizontal angled slots.

FIG. 6B is a cross sectional view of the grid plate of FIG. 5A along an A-A axis.

FIG. 6C is a magnified view of detail C of FIG. 5B.

FIG. 6D is a cross sectional view of the grid plate of FIG. 6A along a B-B axis.

FIG. 6E is a magnified view of detail D of FIG. 6D.

FIG. 6F is a perspective view of the grid plate of FIG. 6A.

FIG. 7A illustrates a grid plate having vertical square slots.

FIG. 7B is a cross sectional view of the grid plate of FIG. 7A along an A-A axis.

FIG. 7C is a magnified view of detail C of FIG. 7B.

FIG. 7D is a cross sectional view of the grid plate of FIG. 7A along a B-B axis.

FIG. 7E is a magnified view of detail D of FIG. 7D.

FIG. 7F is a perspective view of the grid plate of FIG. 7A.

FIG. 8A illustrates a grid plate according to the present invention having horizontal square slots.

FIG. 8B is a cross sectional view of the grid plate of FIG. 8A along an A-A axis.

FIG. 8C is a magnified view of detail C of FIG. 8B.

FIG. 8D is a cross sectional view of the grid plate of FIG. 8A along a B-B axis.

FIG. 8E is a magnified view of detail D of FIG. 8D.

FIG. 8F is a perspective view of the grid plate of FIG. 8A.

FIG. 9A illustrates a grid plate having vertical rounded slots.

FIG. 9B is a cross sectional view of the grid plate of FIG. 9A along an A-A axis.

FIG. 9C is a magnified view of detail C of FIG. 9B.

FIG. 9D is a cross sectional view of the grid plate of FIG. 9A along a B-B axis.

FIG. 9E is a magnified view of detail D of FIG. 5D.

FIG. 9F is a perspective view of the grid plate of FIG. 9A.

FIG. 10A illustrates a grid plate according to the present invention having horizontal rounded slots.

FIG. 10B is a cross sectional view of the grid plate of FIG. 10A along an A-A axis.

FIG. 10C is a magnified view of detail C of FIG. 10B.

FIG. 10D is a cross sectional view of the grid plate of FIG. 10A along a B-B axis.

FIG. 10E is a magnified view of detail D of FIG. 10D.

FIG. 10F is a perspective view of the grid plate of FIG. 10A.

VI. DETAILED DESCRIPTION OF INVENTION

According to the present invention, a current collector having a reduced resistance grid may be utilized with a positive electrode or a negative electrode. Preferably, the current collector grid is used with a positive electrode. A hybrid energy storage device according to the present invention comprises at least one electrode having a reduced resistance grid according to the present invention.

Figure 1:
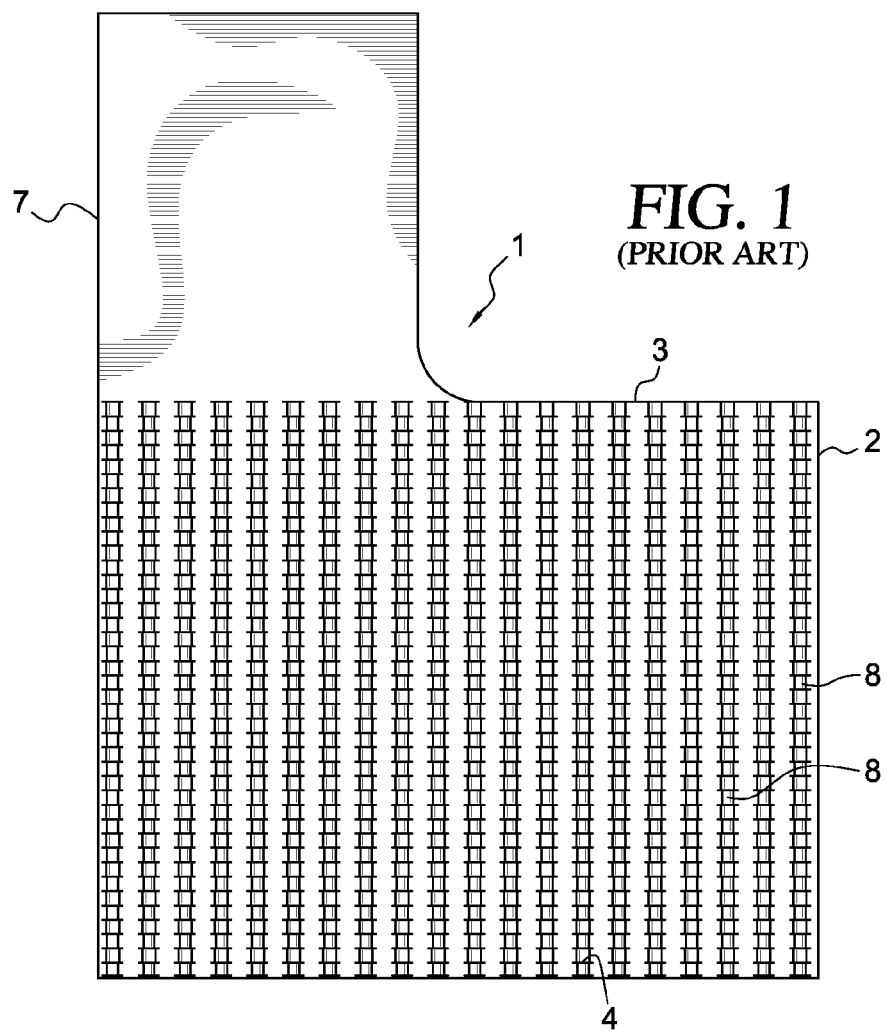
FIG. 1 illustrates a prior art grid plate.
Figure 2:
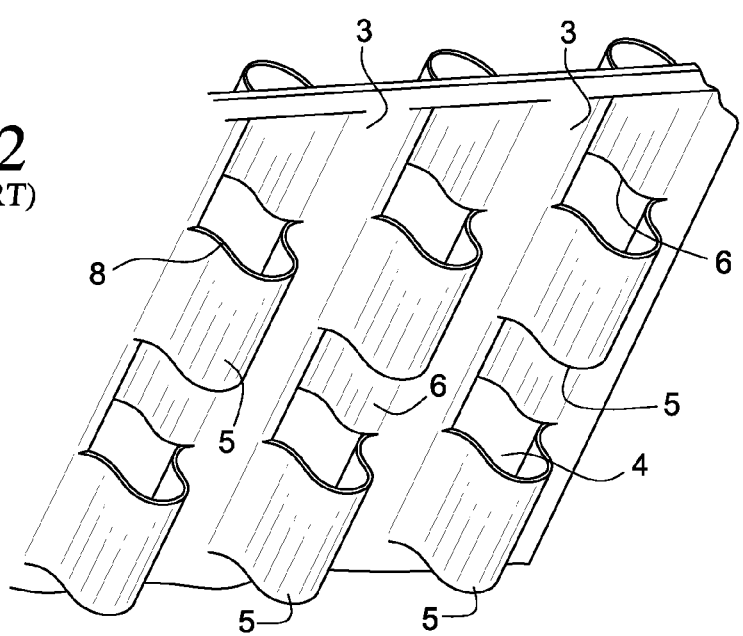
FIG. 2 is an elevation magnified sectional view of FIG. 1.
Figure 3:
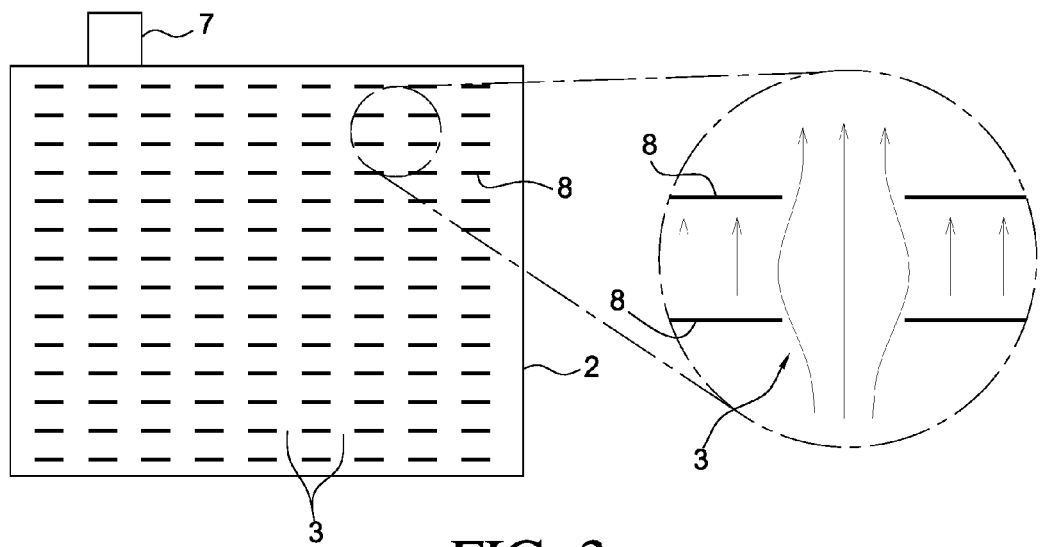
FIG. 3 is a schematic representation of FIG. 1 and of a current flow path through that grid plate.

FIGS. 1-3 illustrate a prior art grid plate 1 of a current collector for an electrode. Generally, the plate 1 is characterized by a grid section 2 disposed below a tab 7 projecting above the upper edge of the plate where the plate incorporates a grid defined by a plurality of continuous, planar, spaced, parallel current channels 3 disposed between interleaved vertical rows 4 of raised and lowered segments 5 and 6.

Vertical rows 4 are established by punching, machining, or casting a planar sheet of conductive material, particularly metals, or molding the sheet directly which results in the creation of slots 8 directed orthogonally/perpendicularly relative to the tab 7 (FIG. 2). The slots permit both electrical and fluid communication between regions where active material or paste is placed behind raised portions 5 and behind lowered segments 6. The slots define the edges of the vertically directed channels established by the raised and lowered segments 5, 6 which are filled with conductive paste (e.g., lead oxides) to provide a current path from the lower portion of the plate to the upper portion and tab 7.

As schematically represented in FIG. 3, the current flow through plate 1 is continuous through the current channels 3 but interrupted between the slots 8 of the interleaved vertical rows 4. It is the presence of the discontinuity-forming slots 8 that provide a plurality of boundary conditions impacting the current flow through the plate to the tab. Over time these boundary conditions are susceptible to corrosion, particularly after repeated discharge and recharge cycles. Corrosion at the boundaries typically takes the form of spalling or flaking of the conductive paste as well as deterioration of the conductive plate. The increasing presence of corrosion at these boundaries results in increased resistance, ohmic loss, and a corresponding loss of power.

Figure 4:
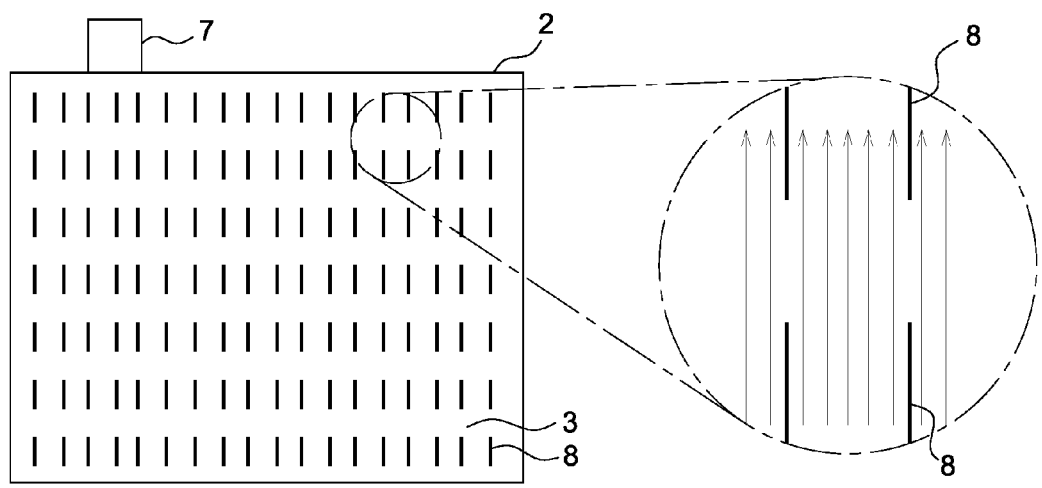
FIG. 4 illustrates a grid plate according to the present invention and a current flow path.

According to the present invention as schematically represented in FIG. 4, the rows of raised and lowered segments 5, 6 are reoriented to a horizontal configuration with respect to the tab. Thus, slots 8 lie in the direction of current flow instead of perpendicular to that flow. In this case, both the current channels 3 and the interleaved rows 4 are disposed horizontally relative to the grid plate's upper edge and the tab 7. In this way, the raised and lower segments of the plate provide substantially uninterrupted, undulating conductive ribbons extending the entire height of the profiled conductive plate. Only the width of the slots 8, rather than their entire length contribute to the establishment of boundary conditions according to the present invention.

The raised and lowered segments, and the slots, may have a variety of shapes including, but not limited to, an angled, square, or rounded configuration.

FIGS. 5A-5F illustrate a grid plate having angled slots with a vertical configuration. In contrast, FIGS. 6A-6F illustrate a grid plate according to the present invention having angled slots with a horizontal configuration.

FIGS. 7A-7F illustrate a grid plate having vertically-oriented square slots. FIGS. 8A-8F illustrate a grid plate according to the present invention having horizontally-oriented square slots.

FIGS. 9A-9F illustrate a grid plate having rounded slots with a vertical configuration. FIGS. 10A-10F illustrate a grid plate according to the present invention having rounded slots with a horizontal orientation.

In other embodiments, the slots and channels of a grid plate may be oriented radially to direct current to the tab.

Figure 11:
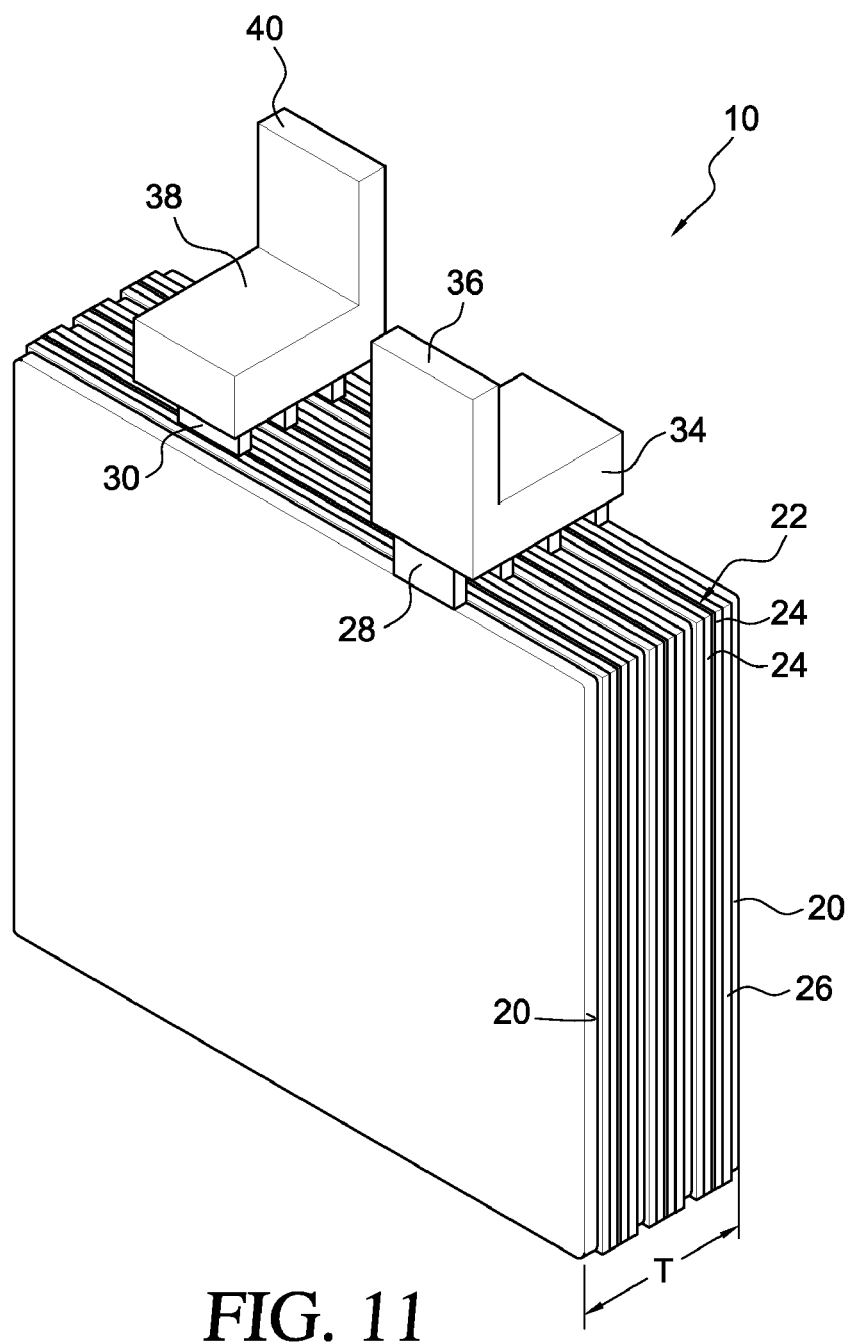
FIG. 11 illustrates a schematic representation of a hybrid energy storage device according to the present invention.

As illustrated in FIG. 11, a hybrid energy storage device 10 according to the present invention comprises at least one cell comprising at least one electrode having a reduced resistance grid structure. The current collector grid may be utilized with a positive electrode or a negative electrode. Preferably, the current collector grid is used with a positive electrode 20. The hybrid energy storage device comprises a separator 26 between at least one positive electrode 20 and at least one negative electrode. The hybrid energy storage device also comprises an electrolyte and a casing.

According to the present invention, a positive electrode of a hybrid energy storage device may comprise a current collector comprising lead or lead alloy; a lead dioxide paste adhered to and in electrical contact with the surfaces thereof;

and a tab element 28 extending from a side, for example from a top edge, of the positive electrode. Positive electrode tab elements 28 may be electrically secured to one another by a cast-on strap 34, which may have a connector structure 36.

A negative electrode may comprise a conductive current collector 22; a corrosion-resistant coating; an activated carbon material 24; and a tab element 30 extending from a side, for example from above a top edge, of the negative electrode. Negative electrode tab elements 30 may be electrically secured to one another by a cast-on strap 38, which may have a connector structure 40.

Typically, the current collector of the negative electrode comprises a material having better conductivity than lead and may comprise copper, iron, titanium, silver, gold, aluminium, platinum, palladium, tin, zinc, cobalt, nickel, magnesium, molybdenum, stainless steel, mixtures thereof, alloys thereof, or combinations thereof.

A corrosion-resistant conductive coating may be applied to the current collector. The corrosion-resistant conductive coating is chemically resistant and electrochemically stable in the in the presence of an electrolyte, for example, an acid electrolyte such as sulfuric acid or any other electrolyte containing sulfur. Thus, ionic flow to or from the current collector is precluded, while electronic conductivity is permitted. The corrosion-resistant coating preferably comprises an impregnated graphite material. The graphite is impregnated with a substance to make the graphite sheet or foil acid-resistant. The substance may be a non-polymeric substance such as paraffin or furfural. Preferably, the graphite is impregnated with paraffin and rosin.

The active material of the negative electrode comprises activated carbon. Activated carbon refers to any predominantly carbon-based material that exhibits a surface area greater than about 100 $m^2/g$, for example, about 100 $m^2/g$ to about 2500 $m^2/g$, as measured using conventional single-point BET techniques (for example, using equipment by Micromeritics FlowSorb III 2305/2310). In certain embodiments, the active material may comprise activated carbon, lead, and conductive carbon. For example, the active material may comprise 5-95 wt. % activated carbon; 95-5 wt. % lead; and 5-20 wt. % conductive carbon.

The active material may be in the form of a sheet that is adhered to and in electrical contact with the corrosion-resistant conductive coating material. In order for the activated carbon to be adhered to and in electrical contact with the corrosion-resistant conductive coating, activated carbon particles may be mixed with a suitable binder substance such as PTFE or ultra high molecular weight polyethylene (e.g., having a molecular weight numbering in the millions, usually between about 2 and about 6 million). The binder material preferably does not exhibit thermoplastic properties or exhibits minimal thermoplastic properties.

According to the present invention, because shedding or flaking of the active material during charge and discharge cycles is significantly reduced, if not precluded, increased cycle life of a hybrid energy storage device may be achieved. Further, because boundary conditions are minimized in the direction of current flow to the tab, the impact of corrosion should be significantly reduced and the cycle life of the energy storage device should be substantially increased.

Another advantage which follows from the present invention is that less lead may be utilized when the current collectors are cast or machined. The undulating matrix will withstand compression forces of at least several psi which may be arise when respective cells into their respective compartments of a casing.

Although specific embodiments of the invention have been described herein, it is understood by those skilled in the art that many other modifications and embodiments of the invention will come to mind to which the invention pertains, having benefit of the teaching presented in the foregoing description and associated drawings.

It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

What is claimed is:

1. An electrode, comprising:
a current collector comprising a grid in a vertical plane having a first top side and a second bottom side, said grid comprising a plurality of planar, parallel current channels disposed between interleaved rows having raised and lowered segments with respect to a mean plane of the current collector, and
a tab portion extending from the first top side of the current collector,
wherein said rows having raised and lowered segments are disposed horizontally relative to the first top side and have bowl regions on a reverse side comprising a lead dioxide active material,
wherein slots defined by edges of said raised and lowered segments lie in a direction of current flow, thereby providing substantially uninterrupted conductive ribbons extending from the second bottom side of the current collector to the first top side and reducing boundary conditions in the direction of current flow from the second bottom side to the first top side.

2. An electrode according to claim 1, wherein said raised and lowered segments have angled slots.

3. An electrode according to claim 1, wherein said raised and lowered segments have square slots.

4. An electrode according to claim 1, wherein said raised and lowered segments have round slots.

5. An electrode according to claim 1, wherein the electrode is a positive electrode and the current collector comprises lead or a lead alloy.

6. An electrode according to claim 5, wherein said raised and lowered segments are filled with a lead dioxide paste.

7. An electrode according to claim 1, wherein the electrode is a negative electrode and the current collector comprises copper or a copper alloy.

8. A hybrid energy storage device, comprising:
at least one cell comprising at least one electrode comprising:
a current collector comprising a grid in a vertical plane having a first top side and a second bottom side, said grid comprising a plurality of planar, parallel current channels disposed between interleaved rows having raised and lowered segments with respect to a mean plane of the current collector, and
a tab portion extending from the first top side of the current collector,
wherein said rows having raised and lowered segments are disposed horizontally relative to the first top side of the current collector and have bowl regions on a reverse side comprising a lead dioxide active material,
wherein slots defined by edges of said raised and lowered segments lie in a direction of current flow, thereby providing substantially uninterrupted conductive ribbons extending from the second bottom side of the current collector to the first top side and reducing boundary conditions in the direction of current flow from the second bottom side to the first to side.

9. A hybrid energy storage device according to claim 8, wherein said at least one electrode comprises at least one negative electrode, and further comprises at least one positive electrode, a separator, and an acid electrolyte.

10. A hybrid energy storage device according to claim 8, wherein the at least one electrode comprises a positive electrode and the current collector comprises lead or a lead alloy.

11. A hybrid energy storage device according to claim 8, wherein the at least one electrode comprises a positive electrode and said raised and lowered segments are filled with a lead dioxide paste.

12. A hybrid energy storage device according to claim 8, wherein the at least one electrode comprises a negative electrode and the current collector comprises copper or a copper alloy.

13. A hybrid energy storage device according to claim 8, comprising a plurality of cells.

14. An electrode according to claim 1, wherein a width of said slots lie in a direction of the current flow.

15. An electrode according to claim 1, wherein said slots are punched from the grid.

* * * * *